Patented Sept. 4, 1951

2,566,415

UNITED STATES PATENT OFFICE 2,566,415

PROCESS FOR MAKING UNSATURATED ETHERS

Raymond I. Hoaglin, South Charleston, and Donald H. Hirsh, Charleston, W. Va., assignors, by mesne assignments, to Union Carbide and Carbon Corporation, a corporation of New York No Drawing. Application August 11, 1948, Serial No. 43,784

13 Claims. (Cl. 260—614)

This invention relates to a method for making unsaturated ethers, in particular 1-alkenyl ethers such as vinyl ethers and substituted vinyl ethers.

A known process for making vinyl ethers involves the catalytic scission of an acetal to form a vinyl ether and an alcohol. This method is well adapted for making the vinyl ethers of the normal alkanols having from one to four carbon atoms. It is not well suited for making the vinyl ethers of the higher alkanols, as the acetals of these alcohols, particularly those containing six to twelve or more carbon atoms, are difficult to vaporize at the desired catalyst temperature because of their high boiling point. Furthermore, the acetals of secondary alcohols, which are necessary intermediates for making vinyl ethers of secondary alcohols by the above method, are difficult to prepare from the secondary alcohol and acetaldehyde as the equilibrium which is established permits only a low yield of the desired acetal to be obtained. Moreover, certain of the vinyl ethers of secondary alcohols, such as vinyl isopropyl ether, are desirable products as they may be polymerized to rubber-like, rather than tacky, polymers.

We have discovered that, in the presence of catalysts which are capable of decomposing acetals to form vinyl ethers and at temperatures of 250° C. to 450° C., a 1-alkenyl ether of a primary alkanol will react with an alcohol different from said alkanol to form the 1-alkenyl ether of the different alcohol. The reaction which occurs may be represented as follows:

(1) 

where R is hydrogen or an alkyl radical, such as a methyl, ethyl, propyl, butyl or octyl radical, $R_1$ is a primary alkyl radical, i. e. a methyl, ethyl, propyl, butyl or octyl radical and $R_2$ is the residue of any aliphatic primary or secondary alcohol provided that in any given case $R_2$ is different from $R_1$. When R is hydrogen in Equation 1, vinyl ethers are represented, and the production of vinyl ethers is the primary object of this invention.

A distinct advantage of the present invention is that the 1-alkenyl ethers of the primary alkanol may be formed in situ by passing the corresponding dialkyl acetal of the alkanol over the catalyst together with the alcohol to be etherified. The over-all reactions for the production of vinyl ethers may be represented as follows:

(2)  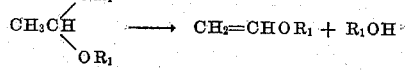

(3) 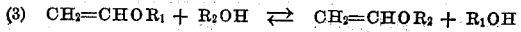

As indicated in Equation 3, the exchange reaction between the vinyl ether and the alcohol does not go to completion, and the reaction mixture will contain the two vinyl ethers and the corresponding alkanol and alcohol. If desired, the vinyl ether of the primary alkanol together with make-up dialkyl acetal and alcohol may be recycled over the catalyst, so that the only vinyl ether isolated as a product is the vinyl ether of the alcohol different from said primary alkanol.

However, the present invention is best suited for making a mixture of vinyl ethers, where a vinyl ether of a primary alkanol containing up to four carbon atoms is desired as the principal product. In a situation such as this, any of the other vinyl ethers of primary or secondary alcohols may be made as co-products by feeding the alcohol to be vinylated together with the dialkyl acetal over the catalyst. Thus, from only one acetal, any desired vinyl ether of a primary or secondary alcohol may be made. Thus, the present invention gives to the acetal-splitting method of making vinyl ethers the flexibility enjoyed by the alternative direct synthesis of vinyl ethers, where only one raw material, acetylene, is required in addition to the alcohol for each vinyl ether made. Moreover, the invention is not limited either by chemical or industrial considerations to the vinylation of alcohols other than primary alkanols containing up to four carbon atoms. For instance, in a plant designed for the commercial production of vinyl n-butyl ether or vinyl propyl ether by the catalytic scission of dibutyl or propyl acetal, vinyl methyl ether or vinyl ethyl ether could readily be made as co-products by including methanol or ethanol in the feed to the catalyst.

Therefore, practically the only limitation on the alcohol to be etherified is the essential one that it be different from the primary alkanol, the 1-alkenyl ether or acetal of which is used in the reaction. Thus, the alcohol may be a saturated aliphatic monohydroxyl compound consisting solely of the elements carbon, hydrogen and oxygen and containing an alcoholic hydroxyl group attached to a carbon atom which itself is attached to not more than two other carbon atoms including methanol, ethanol, isopropanol, butanol, secondary butanol, pentanol, hexanol, heptanol, octanol, nonanol, decanol, undecanol, lauryl alcohol, methoxyethanol, ethoxyethanol, butoxyethanol, or the methyl, ethyl, or butyl monoethers of diethylene glycol. For reasons previously stated, the present process finds its maximum utility in the production of the vinyl ethers of alcohols containing more than six carbon atoms, for instance six to twelve carbon atoms, and in the production of vinyl ethers of secondary alcohols.

The catalyst employed, irrespective of whether the 1-alkenyl ether of the primary alkanol containing up to four carbon atoms is introduced as such or is formed in situ, is any substance capable of decomposing an acetal to form a vinyl ether. A number of such catalysts are known, as follows:

Sigmund and Ucham, Monatsch. 51, 234 (1929), C. A. 23, 2416 (1929).
    Porous clay and nickel catalysts.
Cabanac, Comp. Rend. 190, 881 (1930), C. A. 24, 3755 (1930).
    Thoria, alumina, blue tungstic oxide, and manganese oxide.
Kistiakowsky, J. A. C. S. 60, 441 (1938)
    Platinum on asbestos.
Hermann and Deutsch, U. S. P. No. 1,902,169 (1933)
    Claim 4—"heated metal compound catalysts selected from the group consisting of fuller's earth, burnt brick clays, silica gel, asbestos, feldspars and analogous minerals, zeolites, natural and artificial aluminate-silicates and non-siliceous base exchange compounds." Twenty-six examples.
Baur 1,931,858, U. S. P. No. 1,931,858 (1933)
    Claim 1—"a catalytic substance essentially containing a precious metal in a finely divided form." Seven examples, including silver, palladium and platinum.

However, we prefer to use at temperatures of 250° C. to 350° C. the alkaline-reacting diatomaceous earth catalysts described in application Serial No. 703,321, now abandoned, filed October 15, 1946, by D. H. Hirsh, particularly when the vinyl ether of the primary alkanol is formed in situ from the corresponding dialkyl acetal, as a minimum of by-products is formed with these diatomaceous earth catalysts. Diatomaceous earth is herein deemed to have an alkaline reaction, when an aqueous extract of the earth at room temperature (100 grams of water to 5 grams of earth) has a pH above 7.0. Some commercial forms of diatomaceous earth prepared for use as catalyst carriers already have an alkaline reaction, and these materials may be used without further treatment. However, some commercial varieties of diatomaceous earth have an acid reaction, and these types must be treated with an alkaline material if unsaturated ethers substantially free of aldehydes and saturated ethers are to be produced. Preferably, we treat such acid-reacting diatomaceous earths with a dilute aqueous solution, for instance 2%, of an alkali metal or an alkaline earth metal hydroxide, such as potassium, sodium, lithium, calcium or barium hydroxide, and then we wash the treated earth with water to remove the bulk of the added alkaline material. The washing is not carried so far, however, that the treated earth no longer has an alkaline reaction, as above defined.

The following examples will serve to illustrate the invention:

Example 1.—Vinyl ethyl ether

Three thousand (3000) c. c. of a commercial form of diatomaceous earth having a slightly acid reaction ("Celite" type VIII) and in the shape of cylinders $5/32''$ x $1/16''$ were placed in a vessel and covered with a 2% solution of sodium hydroxide. The solution was then boiled for 10 minutes, after which it was decanted, and the solid material was washed several times with distilled water. Finally, the treated diatomaceous earth was dried at 150° C. for 24 hours.

A mixture of 1 mole of vinyl butyl ether and 2 moles of ethanol was vaporized into a 1-inch steel tube heated by means of an electrically-wired jacket filled with Dowtherm (a eutectic mixture of diphenyl and diphenyl ether). The tube was packed with 600 c. c. of the alkali-treated diatomaceous earth catalyst prepared as above. The rate of feed of the ether-alcohol mixture was about 300 c. c. of liquid per hour and the catalyst bed temperature was 310° to 320° C. The gaseous products were condensed and distilled, giving vinyl ethyl ether in a yield of about 41% per pass, based on the vinyl butyl ether charged.

Example 2.—Vinyl butyl ether

Using the same volume of the catalyst described in Example 1, a mixture of 1 mole of diethyl acetal and 1 mole of butanol was fed to the converter at a rate of 390 c. c. of liquid per hour and a temperature of 315 to 320° C. Vinyl ethyl ether and vinyl butyl ether were obtained in yields of 72% and 20% per pass, respectively.

Example 3.—Vinyl 2-ethylhexyl ether

Vinyl ethyl ether and vinyl 2-ethylhexyl ether were prepared in 70% and 23% yields per pass, respectively, by passing an equimolar mixture of diethyl acetal and 2-ethylhexanol over 600 c. c. of the catalyst described in Example 1. The mixture of reactants was fed at the rate of 389 c. c. of liquid per hour and the catalyst temperature was 320° C.

Example 4.—Vinyl 1-methyl-4-ethyloctyl ether

At a rate of about 600 c. c. of liquid per hour, an equimolar mixture of diethyl acetal and an undecanol (5-ethyl-2-nonanol) was vaporized over 600 c. c. of the catalyst described in Example 1. Vinyl ethyl ether and vinyl 1-methyl-4-ethyloctyl ether were obtained at 315° C. in yields of 69% and 16% per pass, respectively. The latter vinyl ether which has not been reported previously, boils at about 68° C. (1.5 mm. Hg) and has a specific gravity of 0.816 at 20/15.6° C.

Example 5.—Vinyl 1,3-dimethylbutyl ether

Using the same volume of the catalyst previously described an equimolar mixture of vinyl ethyl ether and 4-methyl-2-pentanol was reacted at a temperature of about 325° C. and a feed rate of about 350 c. c. of liquid per hour. Vinyl 1,3-dimethylbutyl ether was obtained in a yield of about 20% per pass. This ether, a new compound, boils at about 47° C. (50 mm. Hg) and has a specific gravity of 0.780 at 20/15.6° C.

Example 6.—Vinyl hexyl ether

Vinyl ethyl ether and vinyl hexyl ether were prepared in 70% and 18% yields per pass, respectively, by passing an equimolar mixture of diethyl acetal and 1-hexanol at about 320° C. over 600 c. c. of the catalyst previously described. The rate of feed of reactants was 350 c. c. of liquid per hour.

Example 7.—1-butenyl methyl ether

An equimolar mixture of methanol and 1-butenyl ethyl ether was passed over 600 c. c. of the catalyst described in Example 1 at a temperature of about 320° C. The rate of feed of the reactants was 349 c. c. of liquid per hour. 1-butenyl methyl ether was obtained in a yield of about 16% per pass.

Example 8.—Vinyl ethyl ether

An equimolar mixture of vinyl 2-ethylhexyl ether and ethanol was fed to a converter similar to that described in Example 1. The converter contained 600 c. c. of a reduced metallic catalyst composed of 98% nickel and 2% chromium supported on fused alumina granules ("Aloxite"). The reactants were fed at the rate of 325 c. c. of liquid per hour and the temperature of the catalyst fed was maintained at about 310° C. Vinyl ethyl ether was obtained in a yield of 16% per pass.

As shown in Examples 1 and 5, the yield of the desired vinyl ether in the exchange reaction can be increased by increasing the molar ratio of the alcohol to the vinyl primary ether. Where the vinyl ether of the primary alkanol is formed in situ, as in Examples 2, 3, 4 and 6, the yield of the vinyl ether of the alcohol fed is lower than the yield of the vinyl ether of the primary alkanol. This yield can be increased somewhat by using higher molar ratios of the alcohol to the acetal or by using longer reaction times to permit the vinyl ether exchange equilibrium to be established. However, the process is best suited to produce a mixture of vinyl ethers, as the combined yield of both vinyl ethers, based on the acetal fed, is over 90%.

In industrial practice, consideration should be given to the ease of separation of the two vinyl ethers and the alkanol and alcohol. Thus, while vinyl isopropyl ether can be obtained from isopropanol and either diethyl acetal or dimethyl acetal, the products from the reaction using dimethyl acetal would be easier to separate by distillation, because of the wider difference in boiling points of the constituents.

Furthermore, the reactants should desirably be anhydrous, because, although a small amount of water will not stop the reaction, the presence of water reduces the yield of vinyl ether through hydrolysis of the vinyl ether or acetal.

What is claimed is:

1. Process for making a 1-alkenyl ether which comprises passing over a catalyst at a temperature of 250° C. to 450° C. a gaseous mixture containing a 1-alkenyl ether of a primary saturated aliphatic monohydric alcohol consisting solely of the elements carbon, hydrogen and oxygen together with a saturated aliphatic monohydroxyl compound different from said alcohol and consisting solely of the elements carbon, hydrogen and oxygen and containing an alcoholic hydroxyl group attached to a carbon atom which itself is attached to not more than two other carbon atoms, and recovering a 1-alkenyl ether of said monohydroxyl compound from the reaction products formed, said catalyst being a catalytic substance of the group consisting of porous clay, nickel, silver, palladium, platinum, thoria, alumina, blue tungstic oxide, manganese oxide, fuller's earth, burnt brick clays, silica gel, asbestos, feldspars, zeolites, natural and artificial aluminate-silicates, and diatomaceous earths which give an alkaline aqueous extract.

2. Process for making a vinyl ether which comprises passing over a catalyst at a temperature of 250° C. to 450° C. a gaseous mixture containing a vinyl ether of a primary saturated aliphatic monohydric alcohol consisting solely of the elements carbon, hydrogen and oxygen together with a saturated aliphatic monohydroxyl compound different from said alcohol and consisting solely of the elements carbon, hydrogen and oxygen and containing an alcoholic hydroxyl group attached to a carbon atom which itself is attached to not more than two other carbon atoms, and recovering a vinyl ether of said monohydroxyl compound from the reaction products formed, said catalyst being a catalytic substance of the group consisting of porous clay, nickel, silver, palladium, platinum, thoria, alumina, blue tungstic oxide, manganese oxide, fuller's earth, burnt brick clays, silica gel, asbestos, feldspars, zeolites, natural and artificial aluminate-silicates, and diatomaceous earths which give an alkaline aqueous extract.

3. Process as claimed in claim 2 in which the monohydroxyl compound is a secondary alcohol.

4. Process as claimed in claim 2 in which the monohydroxyl compound contains from six to twelve carbon atoms.

5. Process for making vinyl ethers which comprises passing over a catalyst at a temperature of 250° to 450° C. a gaseous mixture containing a dialkyl acetal of acetaldehyde with a primary saturated aliphatic monohydric alcohol consisting solely of the elements hydrogen, oxygen and not more than four carbon atoms and together with said acetal a saturated aliphatic monohydroxyl compound different from said alcohol and consisting solely of the elements carbon, hydrogen and oxygen and containing an alcoholic hydroxyl group attached to a carbon atom which itself is attached to not more than two other carbon atoms, and recovering a vinyl ether of said monohydroxyl compound from the reaction products formed, said catalyst being a catalytic substance of the group consisting of porous clay, nickel, silver, palladium, platinum, thoria, alumina, blue tungstic oxide, manganese oxide, fuller's earth, burnt brick clays, silica gel, asbestos, feldspars, zeolites, natural and artificial aluminate-silicates, and diatomaceous earths which give an alkaline aqueous extract.

6. Process as claimed in claim 5 in which the monohydroxyl compound is a secondary alcohol.

7. Process as claimed in claim 5 in which the monohydroxyl compound contains from six to twelve carbon atoms.

8. Process as claimed in claim 1 in which the catalyst is a diatomaceous earth which gives an alkaline aqueous extract and the temperature is 250° to 350° C.

9. Process as claimed in claim 5 in which the catalyst is a diatomaceous earth which gives an alkaline aqueous extract and the temperature is 250° to 350° C.

10. Process for making vinyl ethers which comprises passing a gaseous mixture of diethyl acetal and butanol over a diatomaceous earth catalyst, which gives an alkaline aqueous extract, at a temperature of 250° C. to 350° C., and recovering vinyl ethyl ether and vinyl butyl ether from the reaction products formed.

11. Process for making vinyl ethers which comprises passing a gaseous mixture of diethyl acetal and 2-ethylhexanol over a diatomaceous earth catalyst, which gives an alkaline aqueous extract, at a temperature of 250° C. to 350° C., and recovering vinyl ethyl ether and vinyl 2-ethylhexyl ether from the reaction products formed.

12. Process for making 1-butenyl methyl ether which comprises passing a gaseous mixture of methanol and 1-butenyl ethyl ether over a diatomaceous earth catalyst, which gives an alkaline aqueous extract, at a temperature of 250° C.

to 350° C., and recovering 1-butenyl methyl ether from the reaction products formed.

13. Process for making vinyl 1,3-dimethylbutyl ether which comprises passing at a temperature of 250° to 350° C. a gaseous mixture of vinyl ethyl ether and 4-methyl-2-pentanol over a diatomaceous earth catalyst which gives an alkaline aqueous extract, and recovering vinyl 1,3-dimethyl butyl ether from the reaction products.

RAYMOND I. HOAGLIN.
DONALD H. HIRSH.

REFERENCES CITED

The following references are of record in the file of this patent:

UNITED STATES PATENTS

| Number | Name | Date |
|---|---|---|
| 1,902,169 | Herrmann | Mar. 21, 1933 |
| 1,931,858 | Bauer | Oct. 24, 1933 |